(12) United States Patent
Iwase

(10) Patent No.: US 7,796,317 B2
(45) Date of Patent: Sep. 14, 2010

(54) PROCESSING METHOD AND PROCESSING APPARATUS USING INTERFERED LASER BEAMS

(75) Inventor: Hideo Iwase, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 375 days.

(21) Appl. No.: 11/914,674

(22) PCT Filed: May 18, 2006

(86) PCT No.: PCT/JP2006/310415

§ 371 (c)(1),
(2), (4) Date: Nov. 16, 2007

(87) PCT Pub. No.: WO2006/123835

PCT Pub. Date: Nov. 23, 2006

(65) Prior Publication Data

US 2009/0103181 A1    Apr. 23, 2009

(30) Foreign Application Priority Data

May 18, 2005    (JP)    ............................. 2005-144937
May 16, 2006    (JP)    ............................. 2006-137088

(51) Int. Cl.
 *G02B 26/00*    (2006.01)
(52) U.S. Cl. .................................................... 359/237
(58) Field of Classification Search ................. 359/618, 359/237
See application file for complete search history.

(56) References Cited

U.S. PATENT DOCUMENTS 6,169,631 B1    1/2001    Xuan et al.

FOREIGN PATENT DOCUMENTS

| CN | 2432001 | 5/2001 |
|---|---|---|
| JP | 61-063389 | 4/1986 |
| JP | 62-220919 | 9/1987 |
| JP | 11-170073 | 6/1999 |
| JP | 2000-252610 | 9/2000 |
| JP | 2001-236002 | 8/2001 |
| JP | 2004-038017 | 2/2004 |

OTHER PUBLICATIONS

Ozkan et al., Femtosecond laser-induced periodic structure writing on diamond craystals and microclusters, 1999, Applied Physics Letters, vol. 75, No. 23, 3716-3718.*

(Continued)

*Primary Examiner*—Tarifur Chowdhury
*Assistant Examiner*—Jonathan M Hansen
(74) *Attorney, Agent, or Firm*—Canon U.S.A., Inc. I.P. Division

(57) ABSTRACT

Provided are a processing method and a processing apparatus which are capable of suppressing a disturbance attributable to a surface wave in a processing by interfered laser beams, in particular, a processing by the interfered laser beams of a pulsed laser having a pulse width of equal to or more than 1 fs and of equal to or less than 1 ps, in which the wavelength of a surface wave that propagates in a direction of the interference of the laser is made longer than a pitch of the interference of the laser on a surface of an object to be processed to process the object.

11 Claims, 10 Drawing Sheets

OTHER PUBLICATIONS

Borowiec et al., Subwavelength ripple formation on the surfaces of compund semiconductors irradiated with femtosecond laser pulses, 2003, Applied Physics Letters, vol. 82, No. 25, 4462-4464.*

Park et al., Dynamics of Ripple Formation in Sputter Erosion: Nonlinear Phenomenon, 1999, Physical Review Letters, vol. 83, No. 17, 3486-3489.*

Jurgen Reif etal., Ripples revisited; non-classical morphology at the bottom of femtosecond laser ablation craters in transparent dielectrics, Applied Surface Science 197-198 (2002) 891-895.

International Search Report issued on Aug. 22, 2006 for International Application No. PCT/JP2006/310415.

Kamioka et al., Fine-pitched microgratings encoded by interference of UV femtosecond laser pulses, Journal of Nanoscience and Nanotechnology, 2002, vol. 2, No. 3/4, pp. 321-323.

Kumagai et al., Special controllability of periodic ripple structures generated in laser etching of n-GaAs, Japanese Journal of Applied Physics, Dec. 1992, vol. 31, pp. 4433-4436.

Wu et al., Femtosecond laser-induced periodic surface structure on diamond film, Applied Physics Letters, Mar. 17, 2003, vol. 82, No. 11, pp. 1703-1705.

* cited by examiner

S DEFLECTION

P DEFLECTION

PROCESSING METHOD AND PROCESSING APPARATUS USING INTERFERED LASER BEAMS

TECHNICAL FIELD

The present invention relates to a processing method using interfered laser beams, such as ablation processing, a modification of a material surface, or a resist exposure, and a processing apparatus, and more particularly, to a processing method due to an interference exposure using a pulsed laser having a pulse width of equal to or more than 1 fs and of equal to or less than 1 ps and a processing apparatus.

BACKGROUND ART

As expectations are raised for MEMS and nanotechnology to be a next-generation technology, an attention has been paid to a processing method using interfered laser beams as a method of manufacturing microstructures to be incorporated in the MEMS and involved in the nanotechnology. The processing by the interfered laser beams is capable of processing an area consisting of several μm to several tens cm at a time, unlike electron and ion beam printing. In addition, the processing by the interfered laser beams does not require use of a mask, unlike the photolithography or a LIGA process. Further, in recent years, there has been proposed a processing method using a femtosecond laser as a method of processing a submicron structure using a pulsed laser. The fetmosecond laser has a pulse width of 1 ps ($10^{-12}$ seconds) or less, and very short in the thermal diffusion length in a case where the laser is irradiated onto a member, thus reducing a damage due to the heat.

Also, the use of the femtosecond laser makes it possible to process a material such as glass or plastic, which normally does not have absorbance at the wavelength of the laser, with resolution at the order of submicron. When those transparent materials are irradiated with the femtosecond laser, there locally occurs absorption of photons, which is called "multiphoton absorption". The multiphoton absorption is a photon phenomenon that is caused when a material is irradiated with a strong electromagnetic field, in which photons can be absorbed only in a region where a fluence of the irradiated laser is sufficiently strong.

As a conventional example of the processing method using the femtosecond laser, for example, Japanese Patent Application Laid-Open No. 2001-236002 has proposed a production method of a hologram using the interfered femtosecond laser. In this method, fundamental waves (800 nm in wavelength) of the femtosecond laser are caused to interfere with each other to be irradiated onto a surface of glass, to thereby produce a hologram of micro to submicron pitches by ablation. Also, Journal of Nanoscience and Nanotechnology, 2002, Vol. 2, No. 3/4, 321 to 323 has reported as regards the production of a grating of a pitch of 290 nm with respect to a glass surface through interference of triple waves (290 nm in wavelength).

However, in the processing method using the interfered femtosecond laser in the above conventional example, there is such a problem that the processing is distorted by an electromagnetic wave that propagates on a surface of a material to be processed (hereinafter referred to as "surface wave"), i.e., a surface wave that propagates on the surface of the material to be processed in a direction of interference of the laser. The surface wave is a phenomenon in which a light beam scattered due to nonuniformity of the material surface propagates along the surface of the material, which leads to the processing disturbance generically called "ripple" having cyclicality. The above surface wave or the ripple phenomenon occurs not only in the processing using the femtosecond laser, but also in every processing of irradiating a light having a interference property, such as the modification of physicality through exposure, ablation, photo etching, or light illumination. Also, the surface wave or the ripple phenomenon occurs on a surface of every material, such as metal, semiconductor, glass, plastic, or other dielectric materials. However, the conventional laser that is long in the pulse width or a continuous light is largely affected by heat, and the generated ripple configuration is frequently flattened by thermofusion. However, the disturbance of the processing due to the ripple remarkably appears without being subjected to the flattening action by heat in the processing conducted by the femtosecond laser which is very short in the thermal diffusion length and small in the thermal influence as described above. Also, in the case of metal, because the surface wave propagates as a plasma wave through electrically conductive electrons, the occurrence of ripples is remarkable as compared with the case of the dielectric material.

Hereinafter, a description will be further given of the occurrence of ripples. FIGS. 4A and 4B shows an SEM image of ripples that occur in laser irradiation gas etching (refer to Jpn. J. Appl. Phys. Vol. 31 (1992) pp. 4433 to 4436). FIG. 4A shows a linear polarization having an amplitude of an electric field in a direction indicated in FIG. 5A, that is, ripples caused by an incidence of p-polarized beam. FIG. 4B shows a linear polarization having an amplitude of an electric field in a direction indicated in FIG. 5B, that is, ripples caused by an incidence of S-polarized beam. When it is assumed that the number of waves of the laser is $k_0$, the number of surface waves is $k_{SEW}$, and an incident angle is θ, pitches $d_r$ of the ripples in P-polarization and in S-polarization are expressed by the following expressions (1) and (2), respectively. More specifically, $k_0 = 2.37 \times 10^{-5}$ cm$^{-1}$ (266 nm in the wavelength), θ=13.5°, and $k_{SEW} = 2.55 \times 10^{-5}$ cm$^{-1}$. Therefore, $d_r$ (P-polarization)=345 nm, and $d_r$ (S-polarization)=265 nm.

$$d_r = \frac{2\pi}{k_{SEW} - k_0 \sin\theta} \quad (P \text{ deflection}) \tag{1}$$

$$d_r = \frac{2\pi}{k_{SEW}} \quad (S \text{ deflection}) \tag{2}$$

The above ripples are not limited to a case in which the ripples are provided with one cyclicality in one direction as shown in FIGS. 4A and 4B. FIG. 6 shows an SEM image of ripples that occur when diamond is subjected to ablation processing by the femtosecond laser (refer to Applied Physics Letters, Volume 82, No. 11. (2003) p. 1703 to 1705). In this case, three kinds of ripples different in the pitch and direction from one another can be recognized.

FIGS. 7A and 7B show ripples that occur when the femtosecond laser is perpendicularly irradiated onto a surface of a nickel member at a right angle, and the nickel surface is subjected to ablation processing. As in the case of diamond, three kinds of ripples can be recognized. Those ripples occur because the surface wave having three different wavelengths propagate in a direction orthogonal or parallel with respect to the polarization. Because the incidence angle of the laser is 0°, the number ($k_{SEW}$) of surface waves is obtained from the measured pitch ($d_r$) of the ripples by the following expression (3) on the basis of the expressions (1) and (2).

$$d_r = \frac{2\pi}{k_{SEW}} \tag{3}$$

Table 1 collectively shows a direction of ripples with respect to the polarization which occur in FIGS. 7A and 7B (that is, a propagation direction of the surface wave), the pitch ($d_r$) of the ripples, the number of surface waves ($k_{SEW}$) which is obtained from the pitches (dr) and the expression (3), and the like. In Table 1, the ripples of nickel are expressed as ripple 1, ripple 2, and ripple 3 in ascending order of the number of waves thereof.

TABLE 1

|  | Ripple 1 | Ripple 2 | Ripple 3 |
|---|---|---|---|
| Direction of ripples (propagation direction of surface wave) | Orthogonal to the polarization | Parallel to the polarization | Orthogonal to the polarization |
| Periodicity of Ripple | 1940 nm | 730 nm | 120 to 430 nm |
| Number of surface waves | $3.24 \times 10^{-3}$ (1/nm) | $8.60 \times 10^{-3}$ (1/nm) | 14.6 to $52.3 \times 10^{-3}$ (1/nm) |

The above three kinds of ripples are closely associated with polarization of the laser. FIG. 12 shows an SEM image of the nickel surface in a case where an interfered femtosecond laser is irradiated onto the surface of nickel to produce a grating of the same pitch with that of the interference by ablation. The wavelength of the used femtosecond laser is 800 nm; the interference angle is 90°, and the pitch of interferences is 560 nm. A polarization of the laser is perpendicular to a surface including two laser beams that interfere with each other (hereinafter, called "S-polarization interference"). FIG. 13 is a schematic diagram showing an S-polarization state. In the S-polarization state, the polarization of the two laser beams always coincide with each other regardless of the interference angle. Accordingly, as shown in FIG. 14, the S-polarization state is a state in which a largest difference between a peak 16 (abdomen) and a bottom 17 (node) of the interference, that is, the highest contrast of interference, is obtained, and the S-polarization state is generally used in a process using the interference. As is apparent from FIG. 12, a large number of ripples occur on the surface of nickel which has been processed, and those ripples hinder production of an intended grating of 560 nm in pitch.

As a method of eliminating the above disturbance and breakdown of processing due to the ripples (surface waves), a method is proposed in which a circularly polarized or an ellipsoidally polarized light is used. The use of a polarization state that is attributable to the circularly polarized light or ellipsoidally polarized light makes it possible to rotate the direction in which the ripples occur, along with the rotation of the polarization, to apparently cancel the ripples. However, in a manner of removing the ripples according to the above method, the pitches of ripples are merely made unrecognized through the rotation of the ripples, and a region to be processed is remarkably larger than the case in which processing is conducted by linear polarization. Accordingly, the above method cannot be substantially employed in processing of a submicron size. Also, the processing using the circular polarization or the ellipsoidal polarization cannot be used in an optical system which is greatly affected by the polarization, such as an imaging optical system using the interference or a phase mask.

The present invention has been made in view of the above problems, and therefore has an object to provide a processing method and a processing apparatus which are capable of suppressing a disturbance attributable to a surface wave that occurs in such processing as ablation processing, modification of a material surface or the exposure of a resist, using a interfered laser, in particular, a process using a interfered laser of a pulsed laser having a pulse width of equal to or more than 1 fs and of equal to or less than 1 ps.

DISCLOSURE OF THE INVENTION

In order to solve the above problems, the present invention provides a processing method and a processing apparatus which are structured as follows.

That is, the present invention provides a method of processing an object to be processed by using interfered laser beams, including the steps of: adjusting the lase such that a wavelength of a surface wave that propagates in a direction of interference of the laser becomes longer than a pitch of the interference of the laser beams on a surface of the object to be processed; and processing the object to be processed.

Also, the present invention provides a processing apparatus having a pulsed laser of which laser beams divided into plural laser beams caused to interfere with each other at an interference point on the surface an object to be processed, to process the object, the processing apparatus including: a waveplate, which can adjust a polarization of the laser beam, provided on the respective optical paths of the divided beams extending toward the interference point, in which the laser beams adjusted by the waveplate are caused to interference with each other to process the object to be processed.

According to the present invention, there can be realized processing that is capable of suppressing a disturbance that is attributable to the surface wave in a process that uses the interfered laser, in particular, processing that uses a interfered laser beams using a pulsed laser having a pulse width of equal to or more than 1 fs and of equal to or less than 1 ps. For example, it is possible to realize processing that uses an interfered laser such as ablation processing, the modification of a material surface, or the exposure of a resist.

Other features and advantages of the present invention will be apparent from the following description taken in conjunction with the accompanying drawings.

BRIEF DESCRIPTION OF THE DRAWINGS

FIGS. 4A and 4B are each a diagram showing an SEM image of ripples that occur when GaAs is etched through laser irradiation gas etching, in which FIG. 4A is a diagram showing an SEM image of ripples attributable to a P-polarization incidence, and FIG. 4B is a diagram showing an SEM image of ripples attributable to an S-polarization incidence;

FIGS. 5A and 5B are each a diagram for explaining a difference between the occurrences of ripples which are attributable to the polarization in FIGS. 4A and 4B, in which FIG. 5A is a diagram showing the P-polarization incidence, and FIG. 5B is a diagram showing the S-polarization incidence;

FIGS. 8A and 8B are each a diagram showing an SEM image of processing using interfered laser beams marks on Ni in a case where an intersecting angle θ of the laser is set to 30° in an embodiment according to the present invention, in which FIG. 8A is a diagram showing an SEM image of ripples that is attributable to the S-polarization incidence, and FIG. 8B is a diagram showing, an SEM image of a grating which is attributable to the P-polarization incidence;

FIGS. 9A and 9B are each a diagram showing an SEM image of processing by the interfered laser beams marks on Ni in a case where an intersecting angle θ of the laser is set to 90° in an embodiment according to the present invention, in which FIG. 9A is a diagram showing an SEM image of ripples that is attributable to the S-polarization incidence, and FIG. 9B is a diagram showing an SEM image of a grating which is attributable to the P-polarization incidence;

FIGS. 10A and 10B are each a diagram for explaining a difference between the occurrences of ripples that are attributable to the polarization states in FIGS. 8A, 8B, and FIGS. 9A, 9B, in which FIG. 10A is a diagram showing the S-polarization incidence, and FIG. 10B is a diagram showing the P-polarization incidence;

BEST MODE FOR CARRYING OUT THE INVENTION

Figure 14:
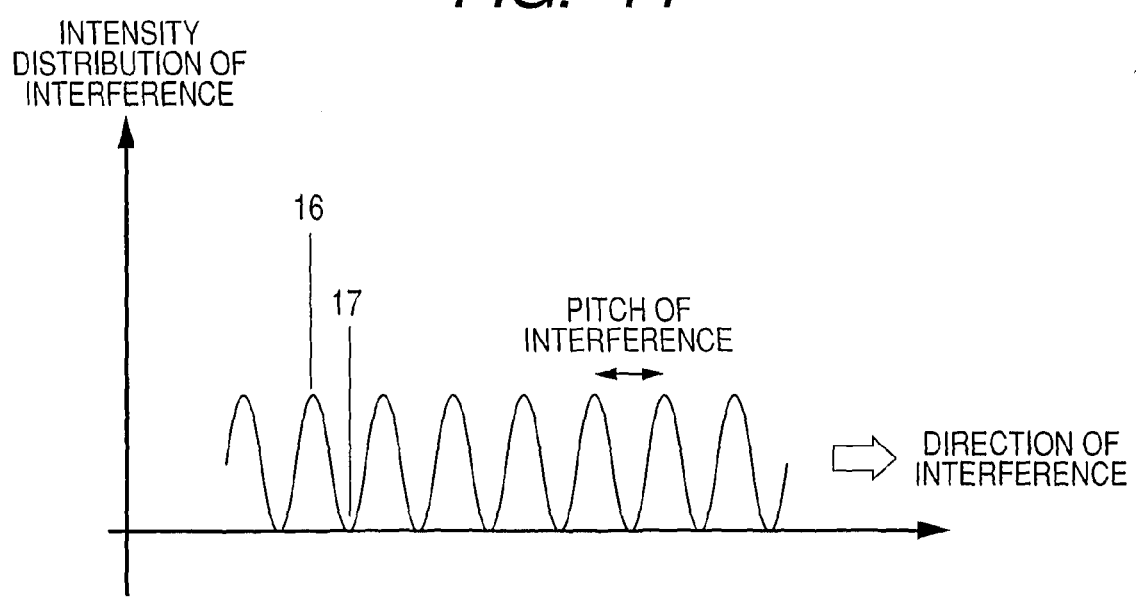
FIG. 14 is a diagram for explaining that the S-polarization state is a polarization state where the highest contrast of interference is obtained because the polarization of two beams always coincide with each other regardless of an interference angle.

The present invention is capable of suppressing a disturbance that is attributable to a surface wave by the above structure, and is based on the following knowledge obtained from the results that have been diligently studied by the present inventors. As described above, the disturbance (breakdown) of processing which is attributable to the ripples also occurs in the case where an interfered light is irradiated onto a member. However, the present inventor has studied those facts in detail and found the following phenomenon. When a pitch (d) of interference of the laser beams is smaller than the wavelength of the surface wave that propagates in a direction of the interference of the laser beams, that is, a pitch (d) is smaller than $2\pi/k"_{SEW}$, the ripples hardly occur across the pitch of the interference, and accordingly it is possible to suppress the disturbance (breakdown) of the processing which is caused by the occurrence of the ripples. The above phenomenon is considered to be brought about because the phase of the surface wave is hard to be defined with the wavelength of the surface wave being longer than the pitch of interference of the laser beams, and the occurrence of the surface wave is suppressed. As shown in FIG. 14, the direction of interference of the laser beams is a direction of pitch of interference.

Figure 1:
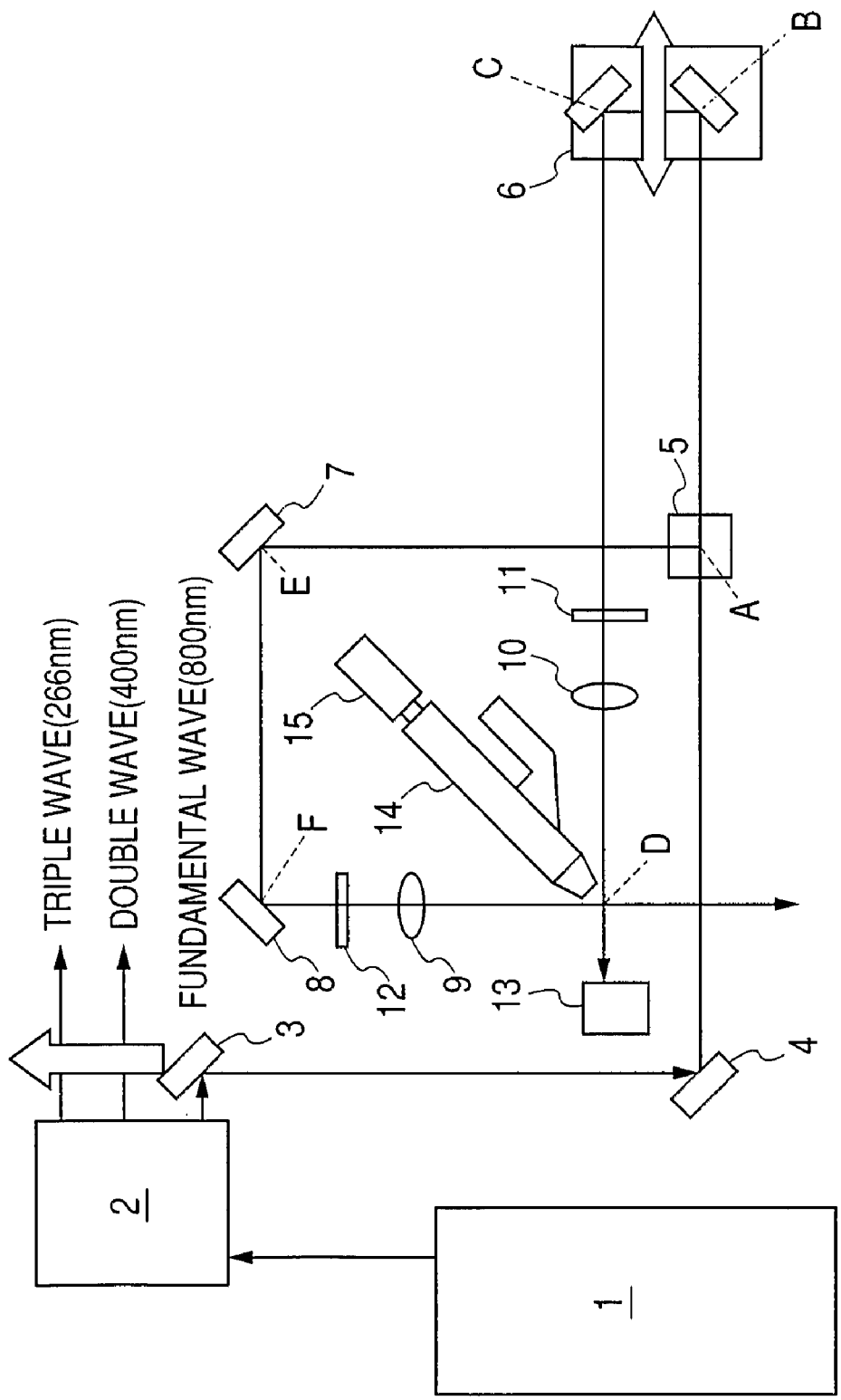
FIG. 1 is a schematic diagram showing a structure of a apparatus used in the present invention.

Prior to a description of the above phenomenon, an processing by the interfered laser beams apparatus used in this embodiment will be first described. FIG. 1 shows a structure of a processing by the interfered laser beams apparatus using a femtosecond laser used in this embodiment. Referring to FIG. 1, reference numeral 1 denotes a femtosecond laser oscillator, 2 is a multiplier wave unit, 3, 4, 7, and 8 are mirrors, and 5 is a beam splitter. Also, reference numeral 6 denotes an optical path length adjuster, 9 and 10 are lenses, 11 and 12 are wavelength plates, 13 is a spectroscope, 14 is a microscope, and 15 is a CCD. The femtosecond laser oscillator 1 is formed of a reproduction amplifier system that is made of titanium/sapphire crystal. In this embodiment, a wavelength of an oscillation laser is 800 nm, the pulse width is 100 fs, and a repetitive frequency of pulses is 1 kHz. The femtosecond laser oscillator 1 is subjected to a grating process. In this embodiment, the pulse width is 100 fs. However, there may be used a laser having a pulse width of equal to or more than 1 fs ($10^{-15}$ seconds) and of equal to or less than 1 ps ($10^{-12}$ seconds). When a pulse width is equal to or more than 1 fs ($10^{-15}$ seconds), an energy required for processing is obtained. When the pulse width is equal to or less than 1 ps, the thermal diffusion length is about 10 nm even in a metal that is generally large in the thermal diffusion, thereby making it possible to process a structure that is shorter than the wavelength of light.

The laser that is outputted from the femtosecond laser oscillator 1 passes through the multiplier wave crystal unit 2 and is modified into a double wave (400 nm) and a triple wave (266 nm). The mirror 3 is slid according to a pitch of grating to be produced, thereby making it possible to select the wavelength of the laser among a fundamental wave, the double wave, and the triple wave. After having passed through the multiplier wave unit, the laser is split into two laser beams by a non-polarization beam splitter 5. One of the laser beams passes through the optical path length adjuster 6, and is superimposed on the other laser beam at a point D (interference point). Because a pulse width of 100 fs corresponds to a pulse width of 30 μm in an atmosphere, it is necessary to make optical path lengths ABCD and AEFD coincide with each other within 30 μm in order to cause the femtosecond laser beams to interfere with each other. In the processing apparatus by using interfered laser beams of this embodiment, a position of the optical path adjuster is moved toward a direction indicated by an arrow to change the lengths of line segments AB and CD are changed, thereby making the optical path lengths coincide with each other.

It is possible to confirm whether or not the optical path lengths coincide with each other, in a case where the wavelength of 800 nm is selected, based on a change in the emission intensity of the triple wave (λ 266 nm) which is attributable to the air breakdown. Also, in the case where the double wave (λ 400 nm) or the triple wave (λ 266 nm) is selected, it is possible to confirm whether or not the optical path lengths coincide with each other by placing a silica glass of 1 mm in thickness at a point D, and measuring a change in the absorption factor due to the nonlinear effect. The λ/2 wavelength plates 11 and 12 are inserted in the optical paths ABCD and AEFC. The λ/2 wavelength plates 11 and 12 are rotated at a desired angle centering to an optical axis to thereby freely change the polarization of both the lasers in processing. The microscope 14 and the CCD 15 are observation systems for observing a surface of an object to be processed. In order to prevent the drawing from being complicated, a filter for adjusting energy and a shutter for adjusting the number of pulses are not shown. In FIG. 1, the laser beams intersect with each other at an angle of 90° at a point A, but the intersection angle (θ) of the laser beams can be arbitrarily adjusted by moving the position of the mirror. A relationship of the intersection angle θ of the laser beams, the wavelength λ of the laser, and the pitch d of the interference are represented by the following expression (4).

$$d = \frac{\lambda}{2\sin\left(\frac{\theta}{2}\right)} \quad (4)$$

Here, before conducting the grating processing, the optical path lengths are made coincide with each other, the interference is confirmed to occur, and polarization are adjusted by using the wavelength plates 11 and 12. Then, an object to be processed is placed at a point D, which is irradiated with the appropriate number of pulses having appropriate energy, to thereby conduct the grating processing.

Figure 2:
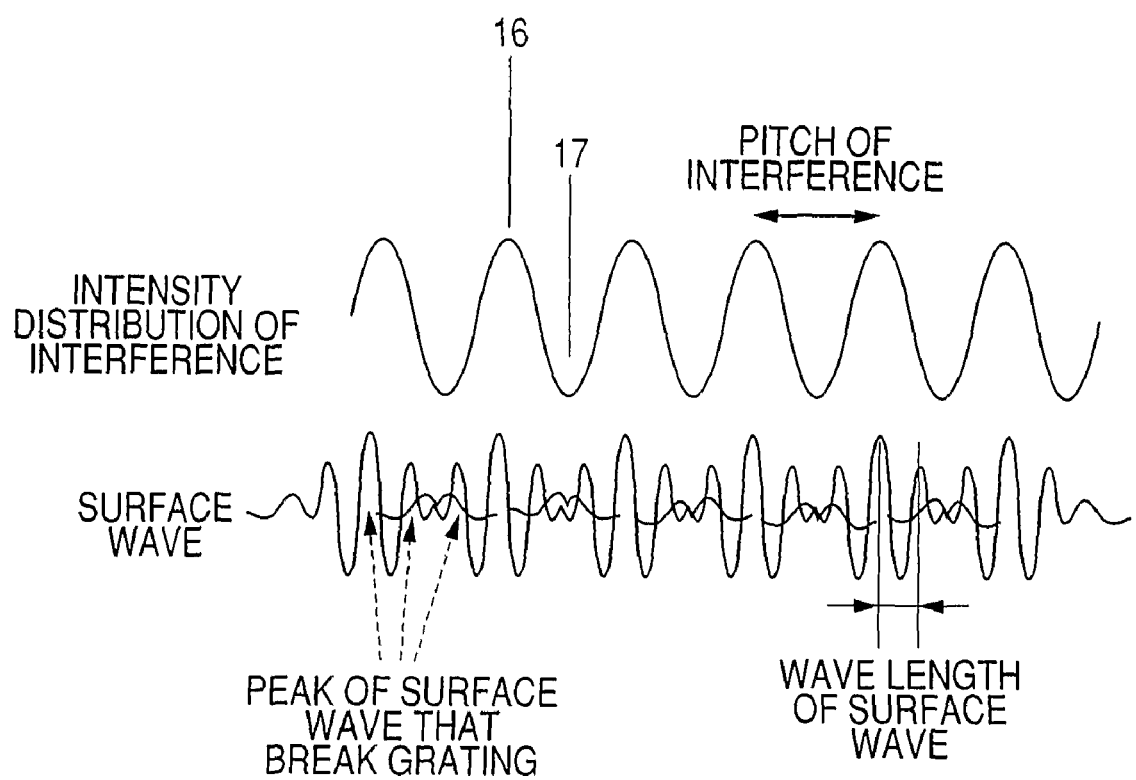
FIG. 2 is a conceptual diagram showing a principle of the present invention.
Figure 3:
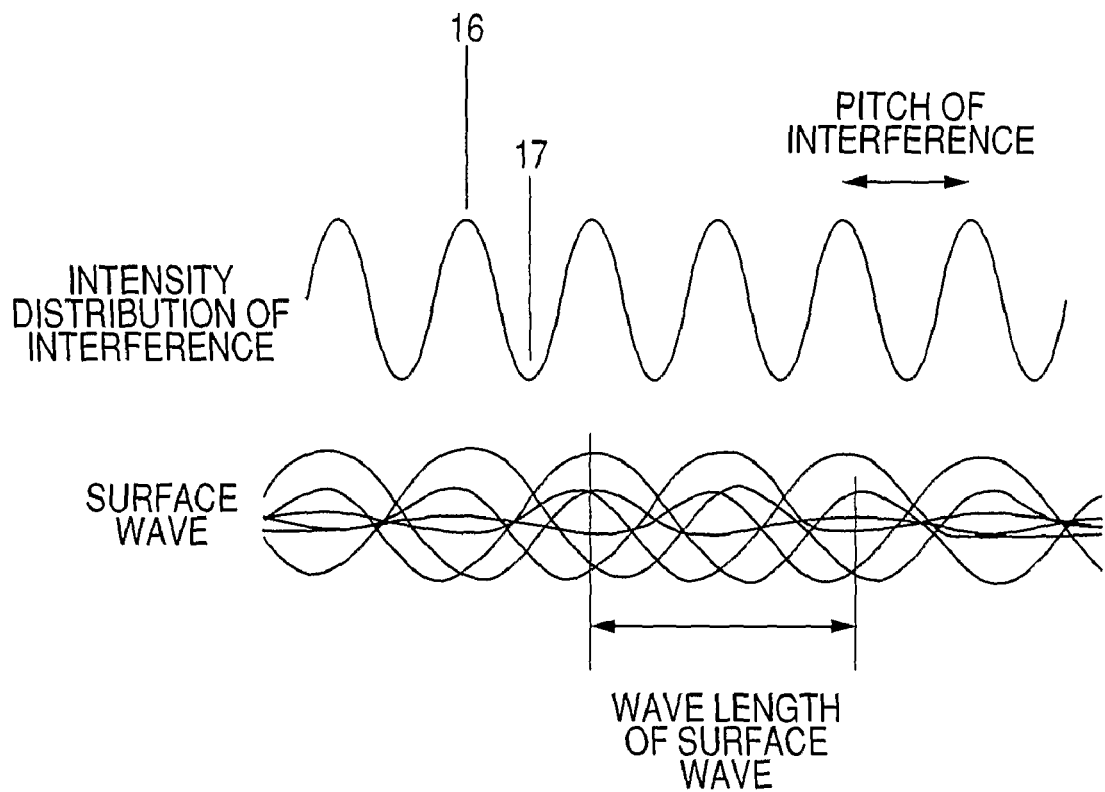
FIG. 3 is a conceptual diagram showing the principle of the present invention.
Figure 4A:
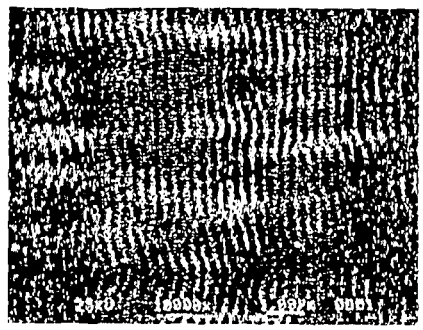
Figure 4B:
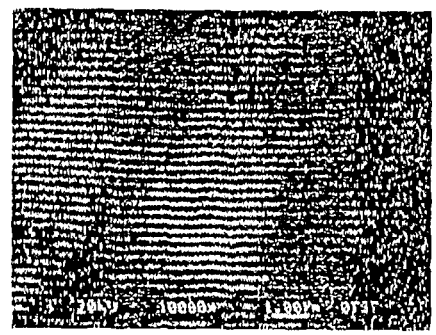
Figure 5A:
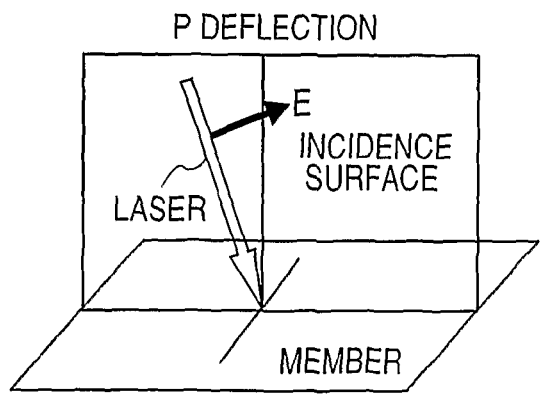
Figure 5B:
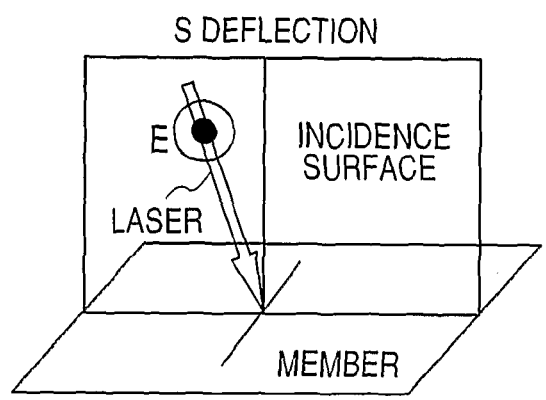
Figure 6:
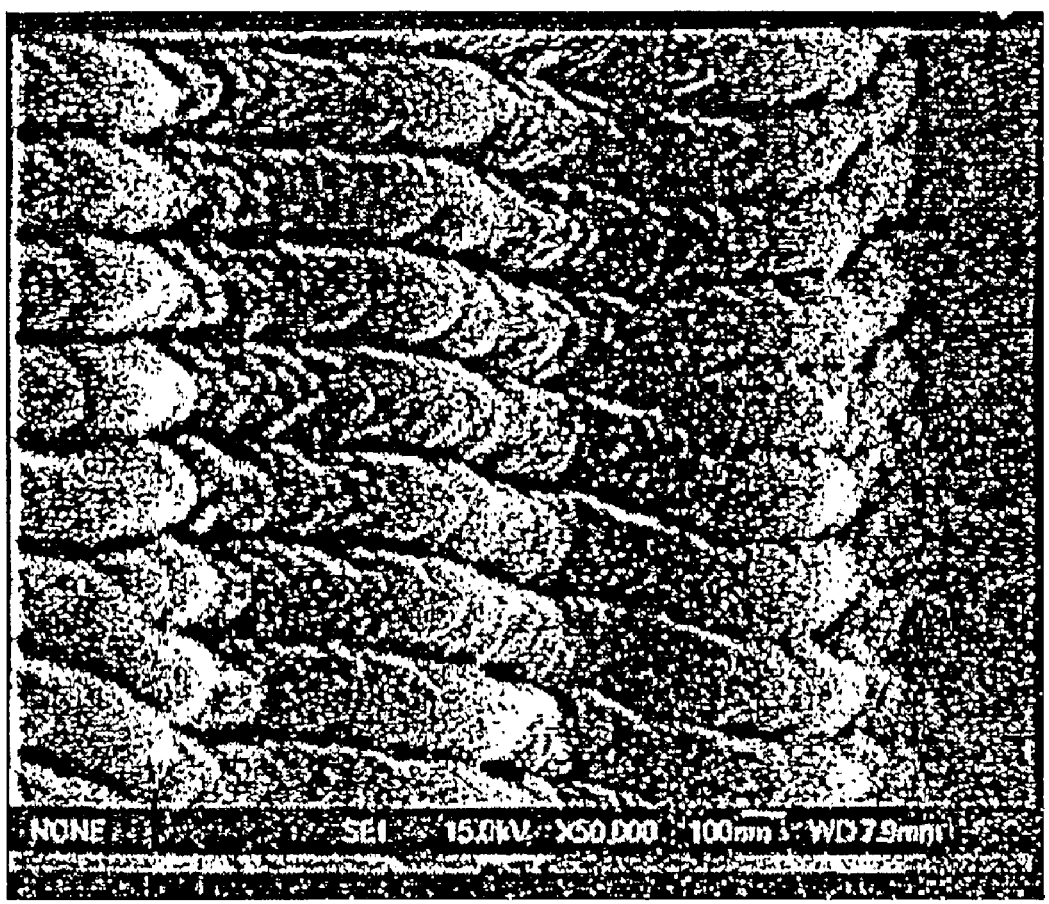
FIG. 6 is a diagram showing an SEM image of ripples that occur when diamond is subjected to ablation processing by a femtosecond laser.
Figure 7A:
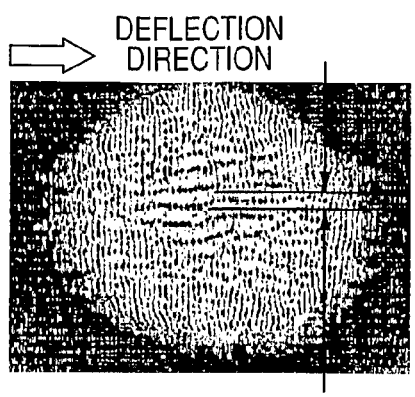
FIGS. 7A and 7B are each a diagram showing an SEM image of ripples that occur when Ni is subjected to ablation processing by a femtosecond laser.
Figure 7B:
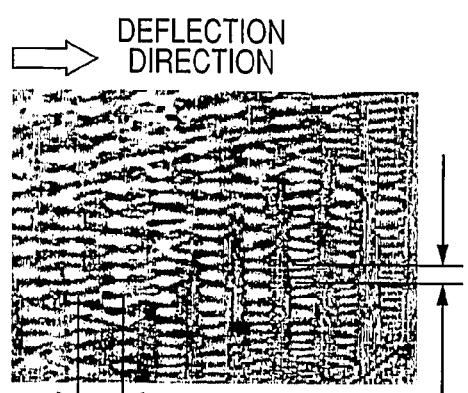

Subsequently, a description will be given of suppression of occurrence of a surface wave in the processing conducted by the apparatus. FIGS. 2 and 3 each show a schematic diagram showing an appearance in which the surface waves are suppressed. The surface wave is excited by a laser that has been irradiated onto a member, and an amplitude of the surface wave is larger as the intensity of the incident laser is larger. Therefore, in the case where the interfered light is irradiated onto the member, the surface wave becomes maximum at the abdomen of the interfered light, and the amplitude of the interfered light becomes smaller toward the node. FIG. 2 shows an amplitude intensity distribution of the surface wave in a case where a pitch of interference is longer than a wavelength of the surface wave. The surface wave excited at each of the abdomens of the interfered light approaches the node of the interference light while being attenuated, and is superimposed on another surface wave that is excited at another abdomen of the interference. However, on the condition shown in FIG. 2, the surface waves that propagate from the adjacent abdomens of the interference light have one or more peaks before being superimposed on another surface wave at the node. The processing pattern and the modification pattern are distorted by the peak of the surface wave.

FIG. 3 shows the amplitude intensity distribution of the surface wave in a case where the wavelength of the surface wave is longer than the pitch of the interference. As in the case shown in FIG. 2, the surface waves that are excited at the abdomen of the interference are superimposed on each other at the node of the interference. However, in a case where the wavelength of the surface wave is longer than the pitch of the interference as shown in FIG. 3, the surface waves that are excited at the adjacent abdomens of the interference light are superimposed on each other before advancing by one wavelength, and those surface waves cancel each other. Accordingly, in the case where the wavelength of the surface wave is longer than the pitch of the interference, the surface wave does not propagate in the direction of interference and it is possible to conduct the processing in which an influence of the surface wave is suppressed.

From the above description, in the present invention, the wavelength of the surface wave that propagates in the direction of interference of the laser is set to be longer than the pitch of the interference of the laser to process the object to be processed, thereby suppressing the disturbance caused by the surface wave. More specifically, the number k"$_{SEW}$ of surface waves that propagate in the direction of interference and the pitch d of the interference are so set as to satisfy the conditions of the following expression (5), thereby realizing the processing of the present invention in which the above disturbance which is attributable to the surface wave can be suppressed.

$$d < \frac{2\pi}{k''_{SEW}} \quad (5)$$

Hereinafter, a description will be given of the embodiments of the present invention.

EXAMPLE

Figure 8A:
Figure 8B:
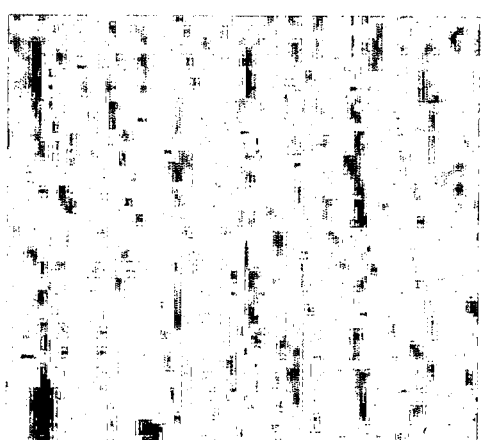

In this example, the above processing apparatus by using interfered laser beams of FIG. 1 was used, in which the power of a laser was adjusted such that the peak intensity of the interference laser became larger than an ablation threshold value of an object to be processed by ablation, and the object to be processed was irradiated with the interfered laser. Then, a grating having the same pitch as that of the interference pitch was directly produced in the object to be processed. FIGS. 8A, 8B and FIGS. 9A, 9B each show an SEM image of processing by the interfered laser beams marks on nickel (Ni) which was manufactured by ablation in this example. FIGS. 8A and 8B each show an SEM image of the processing by the interfered laser beams marks on nickel (Ni) in a case where the intersection angle θ of the laser was set to 30° at a point A in the processing apparatus by using interfered laser beams of FIG. 1 which was used in this example. FIG. 8A shows an SEM image of a grating due to the S-polarization incidence, and FIG. 8B shows an SEM image of a grating due to the P-polarization incidence.

Figure 9A:
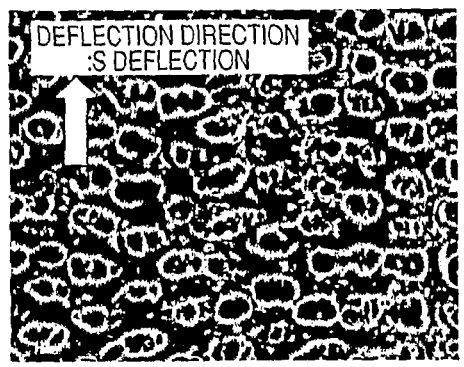
Figure 9B:
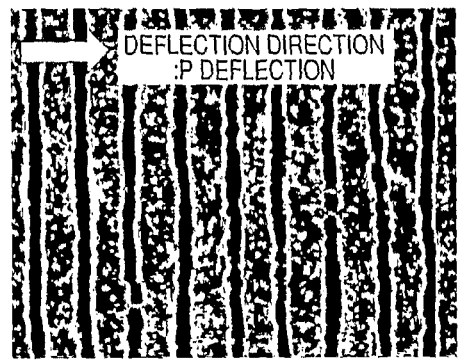

Further, FIGS. 9A and 9B each show an SEM image of the processing by the interfered laser beams marks on nickel (Ni) in a case where the intersection angle θ of the laser was set to 90° at a point A in the processing apparatus by using interfered laser beams of FIG. 1 which was used in this example. FIG. 9A shows an SEM image of a grating due to the S-polarization incidence, and FIG. 9B shows an SEM image of a grating due to the P-polarization incidence.

Figure 10A:
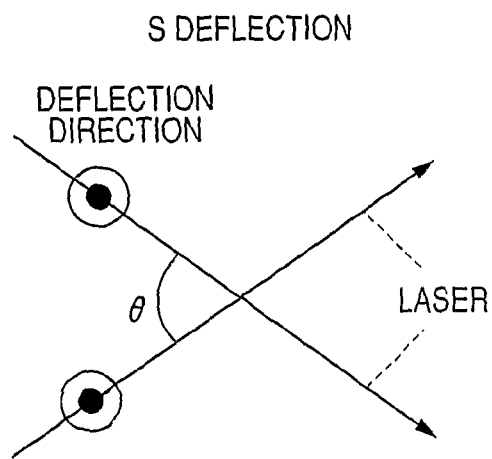
Figure 10B:
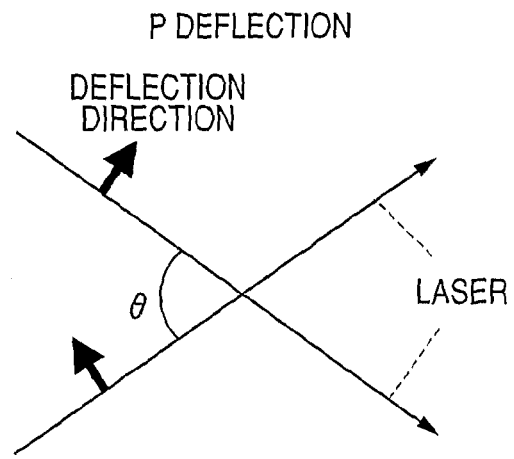

In producing the gratings of FIGS. 8A and 9A, the polarization of the laser used for processing was so adjusted as to be orthogonal to the direction of the interference. In other words, the S-polarization was used for the interfered laser as shown in FIG. 10A. On the contrary, in producing the gratings of FIGS. 8B and 9B, the polarization of the laser used for processing was so adjusted as to be in the direction of the interference. In other words, the P-polarization was used for the interfered laser as shown in FIG. 10B. Table 2 collectively shows the interference pitch, the polarization of the laser, and the wavelength ($\lambda_{SEW}$) of the surface wave in the processing shown in FIGS. 8A, 8B, 9A, and 9B.

TABLE 2

|  | FIG. 8A | FIG. 8B | FIG. 9A | FIG. 9B |
| --- | --- | --- | --- | --- |
| Interference pitch (beams cross angle) polarization of beams | 1545 nm (θ = 30°) Orthogonal to interference direction | 1545 nm (θ = 30°) Parallel to interference direction | 565 nm (θ = 90°) Orthogonal to interference direction | 565 nm (θ = 90°) Parallel to interference direction |

TABLE 2-continued

|  | FIG. 8A | FIG. 8B | FIG. 9A | FIG. 9B |
|---|---|---|---|---|
|  | (S-polarization) | (P-polarization) | (S-polarization) | (P-polarization) |
|  | Propagation direction of surface wave | | | |
| Surface wave 1 (propagate orthogonally to polarization) $k_{SEW} = 3.24 \times 10^{-3}$(1/nm) $\gamma_{SEW} = 1940$(nm) | Parallel to interference direction | Orthogonal to interference direction | Parallel to interference direction | Orthogonal to interference direction |
| Surface wave 2 (propagate in polarization) $k_{SEW} = 8.60 \times 10^{-3}$(1/nm) $\gamma_{SEW} = 730$(nm) | Orthogonal to interference direction | Parallel to interference direction | Orthogonal to interference direction | Parallel to interference direction |
| Surface wave 3 (propagate orthogonally to polarization) $k_{SEW} = 14.6$ to $52.3 \times 10^{-3}$(1/nm) $\gamma_{SEW} = 120$ to $430$(nm) | Parallel to interference direction | Orthogonal to interference direction | Parallel to interference direction | Orthogonal to interference direction |

Here, the wavelengths of the surface waves in Table 2 are obtained from the following expression (6) by using the number ($k_{SEW}$) of surface waves listed in Table 2.

$$\lambda_{SEW} = \frac{2\pi}{k_{SEW}} \quad (6)$$

As is apparent from FIGS. 8A, 8B, 9A, and 9B, all of the gratings in FIGS. 8A, 8B, and 9A except for FIG. 9B are severely damaged by the occurrence of ripples. The grating breakdown of FIGS. 8A, 8B, and 9A can be understood as follows: First, in FIGS. 8A and 9A, the direction of the interference and the polarization are in parallel to each other, and the surface wave 3 propagates in parallel to the direction of the interference. The wavelength of the surface wave 3 is 120 to 430 nm, and cyclically shorter than the interference pitch (1545 nm) of FIG. 8A and the interference pitch (565 nm) of FIG. 9A. For that reason, it can be understood that the surface wave propagated without being suppressed, and the grating was broken. In fact, ripples or the like caused by the surface wave 3 can be recognized in FIGS. 8A and 9A. Also, in FIG. 8B, a surface wave 2 occurs in parallel to the direction of the interference. The wavelength of the surface wave 2 is 730 nm, which is shorter than the interference pitch (1545). As a result, it is presumed that the grating was broken by the ripples as in FIGS. 8A and 9A. In FIG. 9A, the occurrence of the ripples due to the surface wave 2 can be definitely recognized.

On the other hand, in FIG. 9B, the grating was formed without being broken by the ripples. In the case of FIG. 9B, it is estimated that the surface wave 2 propagated in parallel to the direction of the interference as in FIG. 8B. However, because the wavelength (730 nm) of the surface wave was longer than the cycle (565 nm) of the interference, the surface waves that were excited at the adjacent abdomens of the interference cancelled each other with the result that the grating was formed without being broken by the ripples.

Also, on the conditions shown in FIG. 9B, the surface wave 1 and the surface wave 3 must have propagated orthogonally to the direction of the interference. However, the surface waves that propagated orthogonally to the direction of those interfaces hardly affected formation of the grating. As is apparent from this example, in the case where the ablation processing is conducted through the interference, when the wavelength of the surface wave is longer than the cycle of the interference that is in parallel to the surface wave, the surface waves that are excited due to the adjacent abdomens of the interference cancel each other, thereby making it possible to prevent the surface wave from breaking down processing.

Figure 11:
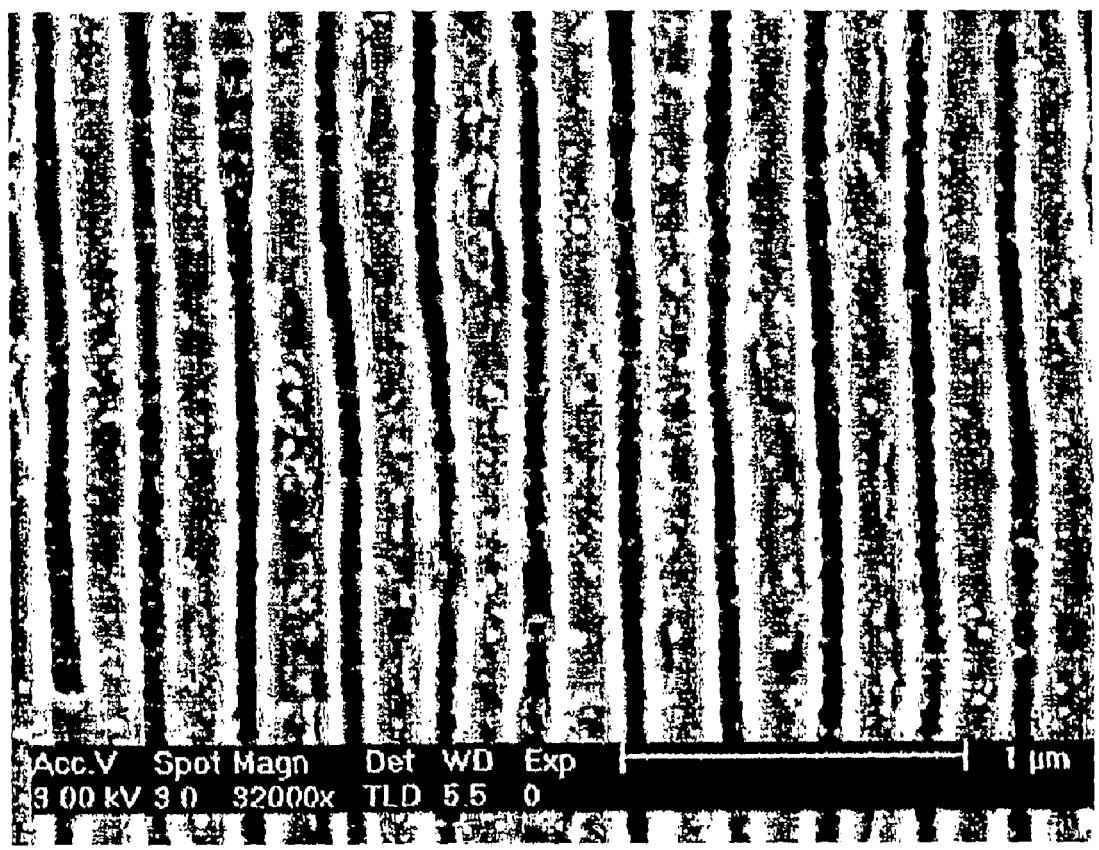
FIG. 11 is a diagram showing an SEM image of processing by the interfered laser beams marks on Ni in the embodiment of the present invention.
Figure 12:
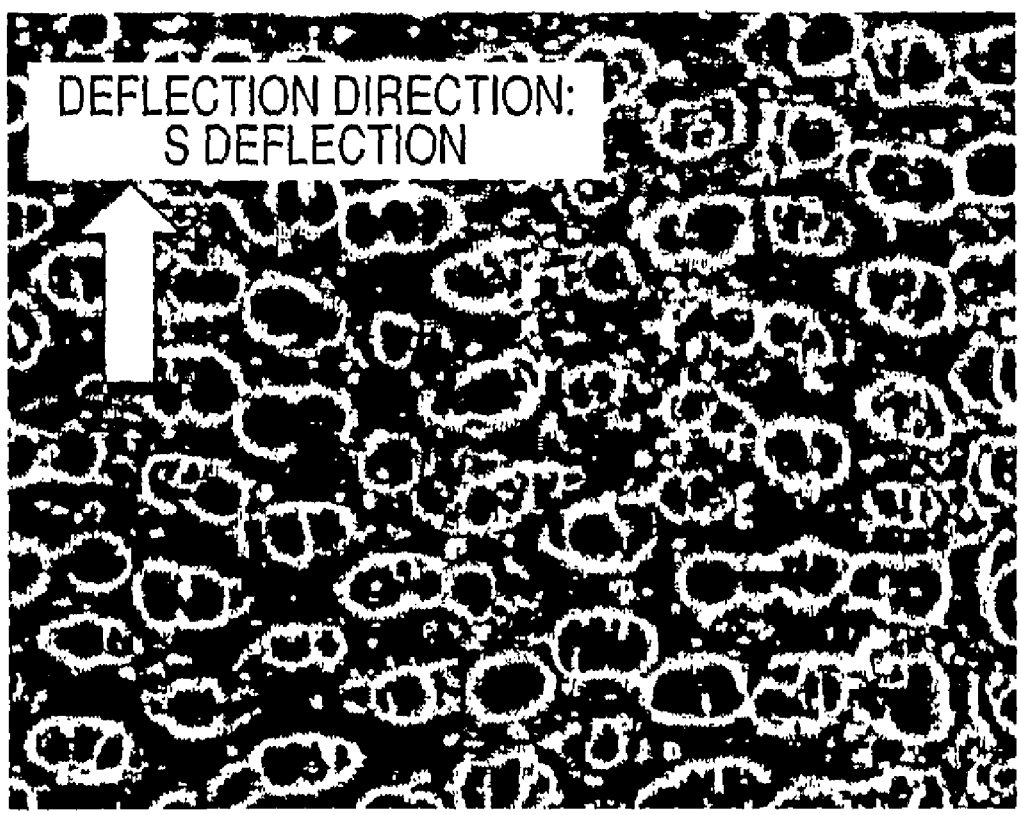
FIG. 12 is a diagram showing an SEM image of a nickel surface in a case where an interfered femtosecond laser is irradiated onto a surface of nickel to produce a grating of the same pitch with that of the interference by ablation.
Figure 13:
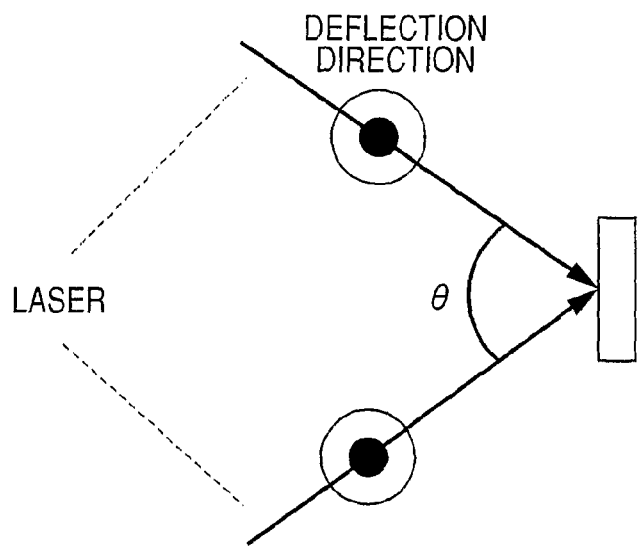
FIG. 13 is a schematic diagram showing an S-polarization state that is generally used in a process using an interference.

FIG. 11 shows the grating in the case where processing was conducted by a double wave (400 nm in wavelength) with the same polarization condition and intersecting angle of the laser as in FIG. 9B. In the case of nickel, when the double wave (400 nm in the wavelength) is used, both of the cycle of the interference and the cycle of the surface wave are the half of those in the case of a fundamental wave (800 nm). Therefore, the cycle of the interference is 290 nm, which satisfies the conditions of the present invention as in FIG. 9B. In FIG. 11, the breakdown of the grating due to the ripples is not found as in FIG. 9B in which the fundamental wave (800 nm in the wavelength) is used.

As a result that a light of 400 nm in wavelength was inputted orthogonally to the grating (565 nm in pitch) shown in FIG. 9B which was produced through the above-mentioned process, a primary diffracted light was recognized in a direction of 45° This shows that the grating functions as a reflective diffraction grating.

Also, the grating structure (290 nm in the pitch) of FIG. 11 was used as a mold to thermally transfer the structure to polyolefin resin. The resin surface to which the structure was transferred had a cyclic structure in which sections of 80 nm in the width and of 130 nm in the height were arranged at a pitch of 290 nm. As the surface reflectivity of the molded polyolefin was investigated, the reflectivity of 1.2% or less was obtained with respect to perpendicular incident light of 600 to 800 nm in wavelength. In general, surface reflection of polyolefin whose surface has been polished is 4.2% (780 nm in wavelength). The mold-transfer product produces a sufficient antireflection effect with respect to the wavelength that is twice or more of the pitch 290 nm.

With the application of the above-mentioned processing method, for example, when a triple higher harmonic wave that is 266 nm in the wavelength is used, it is possible to manufacture the grating having a pitch of 133 nm or less, which makes it possible to form a microstructure having the antireflection effect over an overall visible light range on the surface of a transparent member.

As described above, the present invention does not limit the wavelength of the laser to be used to 800 nm, but is effective in all of the wavelengths. Also, as is apparent from the above expression (4), the pitch of the interference depends on both of the intersection angle ($\theta$) and the wavelength ($\lambda$) of the laser. For that reason, the intersection angle and the wavelength of the laser are appropriately selected, thereby making it possible to find out the conditions on which the grating of a desired pitch which satisfies the present invention is processed. For example, it is assumed that there is a material that generates the surface wave that is 300 nm in the wavelength in the case where the laser of the wavelength λ=400 nm is inputted to the material. In order to process the grating that is 500 nm in the pitch on the surface of the material, if the laser of λ=400 nm is used, the conditions of the present invention are not satisfied. However, the wavelength of the surface wave is generally in proportion to the wavelength of the incident laser. Accordingly, if the laser of the wavelength λ=800 nm is used, the wavelength of the generated surface wave becomes 600 nm, which is larger than the pitch 500 nm of the grating. Thus, the conditions of the present invention can be satisfied.

Also, in this example, Ni was used as the object to be processed. However, even if another material is used as the object to be processed, the present invention can be adapted to the surface wave which occurs on the surface of the object to be processed. The wavelength of the surface wave which occurs on the surface of the object to be processed can be readily measured by inputting a laser having an appropriate power orthogonally to the surface of the object to be processed as in the above description of the present invention.

Also, Laser research, 2000, December. p. 824 and Japan Society for Precision Engineering, Vol. 69, No. 4, 2003 disclose that a mechanism for generating the surface wave is identical in metal and in semiconductor. Also, they disclose that the wavelength of the surface wave that propagates in the direction of the interference hardly depends on the material, and is to same degree as that of the wavelength.

Accordingly, the interference laser of the p-polarization is irradiated, as in this example, onto a surface on which metal and semiconductor are formed, thereby making it possible to suppress the occurrence of the surface wave and subject the grating of submicron to the ablation processing. Also, in this example, the ablation processing was conducted as the processing method. However, the ripple suppressing effect according to the present invention is not limited to the above processing method. For example, the present invention can be applied to a modification of the material surface due to a laser such as fiber bragg grating (FBG) using the interference. In this method, laser beams that have passed through a diffraction grating placed on a fiber are caused to interfere with each other to be irradiated on the fiber. In general, an internal structure of glass or transparent plastic of some kind is changed when irradiated with light of high intensity, and the refractive index is changed. By using the above property, the interfered light is irradiated to cyclically change the refractive index within the fiber. The ripple suppression effect of the present invention is effective in the modification of the material surface by the laser. Also, the interfered laser is irradiated onto a resist film, thereby making it possible to cyclically expose and modify the resist film surface, or expose the resist by using the interference.

This application claims priority from Japanese Patent Application Nos. 2005-144937 filed May 18, 2005 and 2006-137088 filed May 16, 2006, which are hereby incorporated by reference herein.

The invention claimed is:

1. A method of processing an object to be processed by using interfered laser beams, comprising the steps of:
adjusting the laser beams such that a wavelength of a surface wave that propagates in a direction of interference of the laser beams becomes longer than a pitch of the interference of the laser beams on a surface of the object to be processed; and
processing the object to be processed;
wherein when it is assumed that an interference pitch of the laser beams is d and a number of surface waves that propagate in the direction of the interference of the laser beams on the surface of the object to be processed is $k''_{SEW}$, the following conditional expression is satisfied: $d<2\pi/k''_{SEW}$.

2. The processing method according to claim 1, wherein a polarization of the laser beams to be interfered, a wavelength of the laser beams, and/or a cross angle of the laser beams is adjusted.

3. The processing method according to claim 1, wherein a propagation direction of the surface wave that propagates in the direction of the interference of the laser beams is changed by adjusting the polarization of the laser beams to be interfered.

4. The processing method according to claim 3, wherein the surface wave having a shortest wavelength propagates at a right angle with respect to the direction of the interference of the laser beams.

5. The processing method according to claim 2, wherein the polarization is adjusted to a p-polarization.

6. The processing method according to claim 1, wherein the laser beams comprise a pulsed laser having a pulse width of equal to or more than 1 fs and of equal to or less than 1 ps.

7. The processing method according to claim 6, wherein the object to be processed is subjected to ablation processing using the pulsed laser.

8. The processing method according to claim 6, wherein the surface of the object to be processed is modified by using the pulsed laser.

9. The processing method according to claim 1, wherein the object to be processed comprises a metal or semiconductor.

10. A diffraction grating processed by the processing method that uses the interfered laser beams according to claim 1.

11. A microstructure having the antireflection effect processed by the processing method that uses the interfered laser beams according to claim 1.

* * * * *